Aug. 31, 1954　　　D. J. SCHRUM　　　2,687,914
AUTOMOBILE DOOR WINDOW SEAL
Filed March 25, 1952
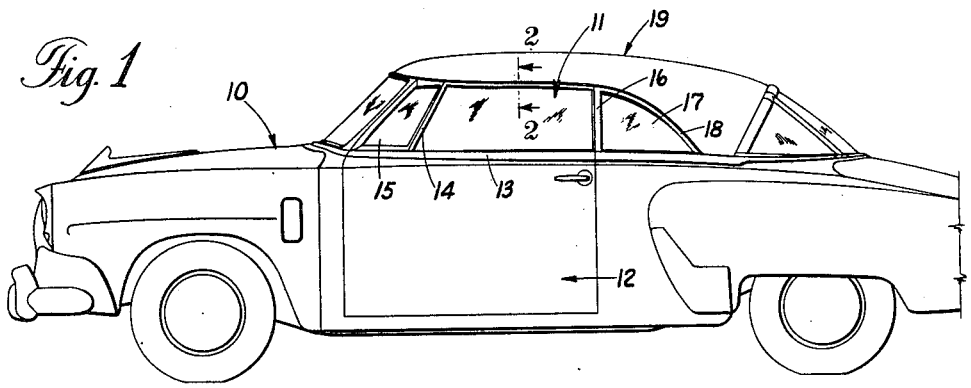
Fig. 1
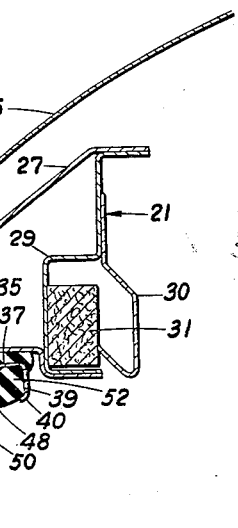
Fig. 3
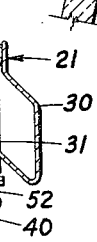
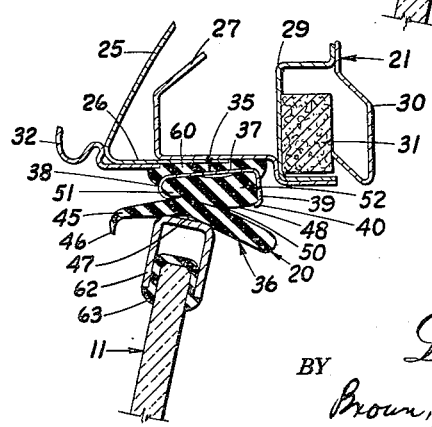
Fig. 2
Fig. 4
INVENTOR.
Donald J. Schrum
BY Brown, Jackson, Boettcher & Dienner
ATTORNEYS.

Patented Aug. 31, 1954

2,687,914

UNITED STATES PATENT OFFICE 2,687,914

AUTOMOBILE DOOR WINDOW SEAL

Donald J. Schrum, South Bend, Ind., assignor to The Studebaker Corporation, South Bend, Ind., a corporation of Delaware Application March 25, 1952, Serial No. 278,422

1 Claim. (Cl. 296—44)

My present invention is concerned generally with sealing means and more particularly with improvements in sealing means to be used around windows and more specifically around automobile windows or the like.

One of the outstanding features of my present invention is the provision of an improved and simplified resilient rubber weather seal between the upper end, especially, of a roll-down automobile door window and the vehicle's body. Particularly, my invention concerns the provision of a sealing means between the window edge and frame in automobiles, especially automobiles of the convertible, collapsible top variety and the modern so-called "hard top" convertible variety.

As will be appreciated by one familiar with the automobile industry, an effective window sealing means for the "hard top" convertible model, as well as other models, has been long sought. The problems confronting the designing and provision of an effective weather seal for use in this particular class of vehicles are complicated by the fact that there is an absence of the conventional window frame ordinarily carried by the door, across the upper end or edge of the window. This means that the seal between window and roof must be carried by the roof framing.

With my present invention an effective and improved seal is available which utilizes a compressible "hinging" weather stripping means and which is adapted to perform its sealing function with the adjacent upper edge of the window whenever it is brought into compressing contact with the window edge. Further, this compressive contact with the window edge may occur either by raising the window so as to approach the sealing strip from substantially therebelow or in a vertical direction or by closing the door with the window raised so that the window approaches the sealing strip from a substantially lateral or horizontal direction.

The main object of my present invention is to disclose the features of a new and improved window sealing means, especially adapted for use in automotive vehicles.

Another object of my invention is to disclose the features of a new and improved weather seal embodying improved features to accommodate a sealing function with a window edge or the like which is movable relative to the seal and may approach the same for contact from both substantially horizontal and vertical directions.

The above and further objects and features of my invention will be recognized by one familiar with this art from the following description and specification therefor and with reference to the accompanying drawings which illustrate a preferred embodiment of my invention.

In the drawings:

Figure 1 is a side elevational representation of a modern automobile provided with a window sealing means according to my present invention;

Figure 2 is a partial enlarged cross sectional view taken substantially along line 2—2 of Figure 1 and looking in the direction of the arrows to demonstrate the operational relation between my sealing means and the vehicle's window upper edge when such are in sealing relation with one another;

Figure 3 is another enlarged cross sectional view, similar to Figure 2, but showing my sealing means and the adjacent edge of a roll-down window in disengaged relation as the window is approaching the sealing means for contact therewith from a substantially vertical direction relative to the sealing means, that is as the window of the vehicle is being raised with the door closed; and Figure 4 is an enlarged cross sectional view, similar to Figures 2 and 3, showing the relation of my sealing means and the automobile's window as the raised window approaches the sealing means for contact therewith from a substantially lateral direction relative to the sealing means, that is, when the window is in raised position and the door carrying such is being closed.

As indicated from Figure 1 of the drawings, my present invention is adapted for use with an automotive vehicle, such as 10 illustrated therein, although its use in other circumstances will be readily suggested to one familiar with the art. Nevertheless, in its preferred embodiment my invention is best suited for use in a vehicle of the class shown and in which a window panel 11 of the conventional roll-down variety is mounted in a door 12 adapted for hinging movement in a familiar manner; the door terminating at a substantially horizontally disposed reveal member 13 at its upper end. A forward lateral guide member for the window 11 constitutes a division channel 14 carried by the door 12 and positioned to the rear of a familiar no-draft ventilator 15. The rearward edge of window 11 is engageable with a second channel frame member 16 which carries a conventional rubber gasket for sealing with window 11 and which frame member constitutes a forward frame member for a small rear side window 17. Frame 16 along with an upper frame member 18 bounds the rear window 17 and moves therewith in an arcuate path away from window 11 when being lowered. However, due to the character of the particular class of vehicle illustrated, which is the present commercial so-called "hard top" convertible, no channel or frame member is provided interconnecting the upper ends of the substantially vertical or lateral channel members 14 and 16, as in the conventional sedan or coupe models of automobiles. It is to the provision of a sealing means intermediate the upper ends of the windows 11 and 17 and the roof 19 of the automobile 10 and between the door frame around window 15 and the adjacent roof and windshield frame, that my present invention is especially directed, although its use with other types of automobiles is also contemplated.

With particular reference to Figures 2 through 4 of the drawings, it will be seen that my new and improved sealing means 20, as illustrated, is to be mounted along the underside of the roof framing 21 which defines an upper cross extension or limit to the opening in which the window panels 11, 15 and 17 are mounted.

The sealing means 20 further extends forwardly over the top and front side of the no draft ventilator framing to a point adjacent the junction of the windshield frame and body belt line as defined by reveal 13 and rearwardly across the upper and rearward sides of the rear side window 17.

Looking at the sectional view taken through the roof framing and window 11, as shown in Figures 2 to 4 of the drawings, will demonstrate that the roof framing at that particular area constitutes a built up structure including the exterior roof panel 25 having an inwardly turned lower platform section 26 which is rigidly attached as by spot welds, or the like, to an interior composite frame structure including a substantially trapezoidal shaped metal channel member 27, reinforcing channel member 29 and roof trim retaining member 30. A paper strip member 31 is disposed between separated portions of the channel member 29 and roof trim retaining member 30, all in a conventional manner. Further, a drip moulding member 32 is spot welded to the underside of the platform portion 26 of the roof panel so as to present a drip trough outwardly and adjacent the lower edge of the roof panel 25, as is conventional practice.

It is to the lower platform portion or sill of the roof panel and composite interior framing that my present sealing means 20 is connected. As will be appreciated from a study of Figure 3 in particular, my sealing means comprises a metal mounting channel member 35 and a resilient weather stripping 36 suitably carried by the mounting channel, as will be described presently. Mounting channel 35 is preferably made of a stainless or non-corrosive steel so as to be resistant to deterioration from rust and the effects of water especially. The mounting channel member constitutes an elongated strip which may be extruded if desired or rolled and bent in to a substantially C-shape so as to have a planar upper mounting platform portion 37 at the outward lateral edge of which is formed a reentrant and downwardly directed curved or beaded edge 38 and at the inward edge of which is extended a substantially transversely related rear wall portion 39. The rear wall portion 39 is also preferably formed with an inwardly directed lower beaded edge 40 opposed, in its curved direction, to the curved direction of the leading edge or bead 38 of the channel member, for purposes which will appear presently.

As best shown in Figures 3 and 4, wherein my weather seal is shown in its open or uncompressed state, such constitutes an extruded pliable stripping member having a substantially Y-shaped cross sectional configuration and best made from rubber. The extruded weather stripping 36 includes a substantially dog-leg shaped lower arm portion 45 having a downwardly turned lip 46 at its outer edge and an intermediate elbow bend 47. The stripping 36 also includes an upper mounting arm 48 formed in spaced relation relative to lower arm 45, but connected integrally thereto by means of an intervening neck portion 50. The upper arm is provided with a beaded finger 51 along its outer edge (configured to mate with the interior curve of the mounting channel's outer bead 38) and a thickened foot portion 52 along its inner edge, configured to nest against the interior facing of the mounting channel's depending end wall 39. For appearance sake and to avoid sticking between the two arm portions 45 and 48 in their compressed state, as shown in Figure 2 of the drawings, a thin felt facing is provided over the adjacent faces of the two arm portions of the weather seal stripping 36.

To assemble my weather stripping along the underface of the sill formed by the roof structure, I first mount a cushioning strip 60 of a suitable resilient material, such as rubber, to the underside of the roof panel's lower platform portion 26. The cushioning strip, as illustrated, is slightly recessed along its underside to nest with the upper face of the mounting channel platform portion 37 and the channel member is then rigidly secured to the frame structure of the roof by means of a plurality of metal screws 61 or the like, inserted vertically through the mounting channel and the cushion strip 60. Thusly mounted, it will be recognized that the beaded edge 38 of the mounting channel lies nearest the exterior edge of the roof in substantially parallel relation immediately beneath the cushion strip and lower platform 26 of the roof panel. My sealing strip is then mounted securely to the mounting channel 35 by compressing the upper arm 48 thereof to bow the same slightly upward or concavely so that the beaded finger 51 thereof engages the inside curve of the beaded lip 38 of the mounting channel and the enlarged foot portion 52 thereof engages the inside face of the rearward or depending wall portion 39 of the mounting channel. When so mounted with the channel member, the sealing strip is positioned with its lower arm 45 inclined upwardly in angular relation relative to the substantially horizontal lower platform portion of the roof panel so that the depending lip 46 thereof is disposed substantially beneath the drip trough. The upper arm 48 of the stripping is maintained in compressed state within the mounting channel and the portion of the lower arm inwardly of the elbow bend 47 lies in a near vertical position.

As best illustrated in Figures 2 through 4 of the drawings, the upper edge of the window pane 11 is surrounded by a window frame 62 which is clamped over the window edge outwardly of a rubber gasket member 63 to provide a frame means which is carried with the window and acts as a protective device to prevent chipping or breakage of the upper edge of the window.

*Use and operation*

It will be recognized that with the window rolled down and the door closed, the relationship between the upper end of the window 11 and my sealing means 20 is substantially as illustrated in Figure 3 of the drawings, with the pliable sealing strip 36 and especially the lower arm portion 45 thereof being disposed somewhat in angular relation to the plane of the window pane 11. As the window 11 is rolled upwardly it will eventually reach its Figure 2 position wherein the outside corners of the somewhat rectangular window frame member 62 will contact the underside of the stripping's lower arm portion 45 on opposite sides of the elbow bend 47 thereof and substantially in line with the neck portion 50 thereof. As the window is moved to a fully raised position, resilient compression of the weather stripping 36 takes place to squeeze the upper arm portion thereof into substantially registering relation inside the mounting channel 35 and forcing the lower arm portion 45 to swing or hinge about neck 50 to a substantially horizontal position transversely across the upper edge of window pane. In this fully closed condition the compressed weather stripping forms an efficient and effective weather seal along the upper edge of the guard strip 62, leaving a small gap immediately below the elbow bend 47 at the lower arm portion 45. This means that there is substantailly double line sealing contact at two separated areas between the upper edge of the window assembly and my new and improved sealing means.

As also will be appreciated, another condition of approach between the window and my new and improved sealing means is possible as represented in the drawings by Figure 4. This second operating condition normally occurs when the window is fully raised and the door is being swung closed so that the upper edge of the window approaches my new and improved sealing means from a substantially lateral direction as opposed to its substantially vertical approach, as illustrated in Figure 3 of the drawings. Due to the depending relation of the angularly disposed lower arm of my sealing strip, lateral motion of the window edge toward my sealing means causes eventual contact of the inside edge of the window frame 62 with the depending portion of the lower arm thereof to swing the lower arm, about the hinge connecting neck portion 50, to its substantial horizontal Figure 2 position, thus effecting a tight seal as before. It will also be noted that in its sealed engagement with the upper edge of the window my new and improved sealing means provides an overhang on both the inside and outside faces of the window and substantially transverse to the plane of the window. This feature is especially desirable as related to the exterior overhang, which comprises that portion of the lower arm which contains the depending lip 46, since the presence of water due to rain, or the like, intermediate the drip moulding member 32 and the lower arm portion of my sealing means will be quickly carried away by the downward slope of this overhanging portion. Provision of my sealing means about the window 17 and between the door frame about ventilator 15 and the adjacent roof and windshield likewise provides an effective sealing means along such areas.

Thus it will be recognized that I have provided a new and improved sealing means readily adapted for use in the automobile industry for providing an effective seal intermediate the upper edge or end of a roll-down style of window and the roof frame structure of the vehicle. Further, while I have shown and described a preferred embodiment in which the teachings of my invention may appear and have related its use with a "hard top" or convertible style of automobile in which the normal window framing, generally carried by the door structure, is absent, it will be appreciated that other uses and adaptations of my invention may be made readily without departing from the spirit and scope thereof. Further, I contemplate that various changes, modifications and substitutions of equivalents may be made in my invention without violating the essence and scope thereof. Therefore, I do not wish to be limited to the specific embodiment of my invention herein illustrated and described except as may appear in the following appended claim.

I claim:

A weather stripping assembly for providing an effective weather seal between the edge of a roll down window glass and the surrounding frame therefor in an automobible and the like, comprising in combination, an elongated metal mounting channel member, substantially C-shaped in cross section and formed with a mounting platform and two laterally spaced side wall portions depending from said platform, fastener means fastening said channel member securely to said window frame, a resilient weather stripping member, having a substantially Y-shaped cross section, insertably mounted in said channel member and comprising an upper arm portion, a lower arm portion and a neck portion; said neck portion integrally interconnecting said two arm portions intermediate their edges; the said upper arm portion being of substantially greater width than the measurement between the side wall portions of said channel member whereby the same is bowed arcuately outward intermediate its edges when the same is compressibly interfitted between said channel member's side wall portions, said lower arm portion extending beyond the lateral limits of said channel member and upper arm portion and normally lying in angular disposition relative to the latter, and said neck portion lying substantially transverse of said two arm portions and at a location aligned substantially coplanar with the plane of said window glass; closure of said window glass against said lower arm portion serving to hinge the same arcuately about said neck portion and into a position substantially transverse of the plane of said window glass and simultaneously causing a reduction in the arcuate bow in said upper arm portion by compressing the same toward the platform portion of said channel member; such reduction in the bow of said upper arm portion resulting in a resilient opposition to continued movement of said window glass toward the weather stripping and a resultant increase in contacting pressure between the said lower arm portion and the adjacent edge of said winow glass.

References Cited in the file of this patent

UNITED STATES PATENTS

| Number | Name | Date |
|---|---|---|
| 2,278,646 | Clark | Apr. 7, 1942 |

FOREIGN PATENTS

| Number | Country | Date |
|---|---|---|
| 602,276 | Germany | Sept. 5, 1934 |
| 634,860 | Germany | Sept. 5, 1936 |